Aug. 18, 1925.
H. T. KINGSBURY
TOOL SPINDLE BEARING
Filed Dec. 6, 1921  2 Sheets-Sheet 1
1,550,264
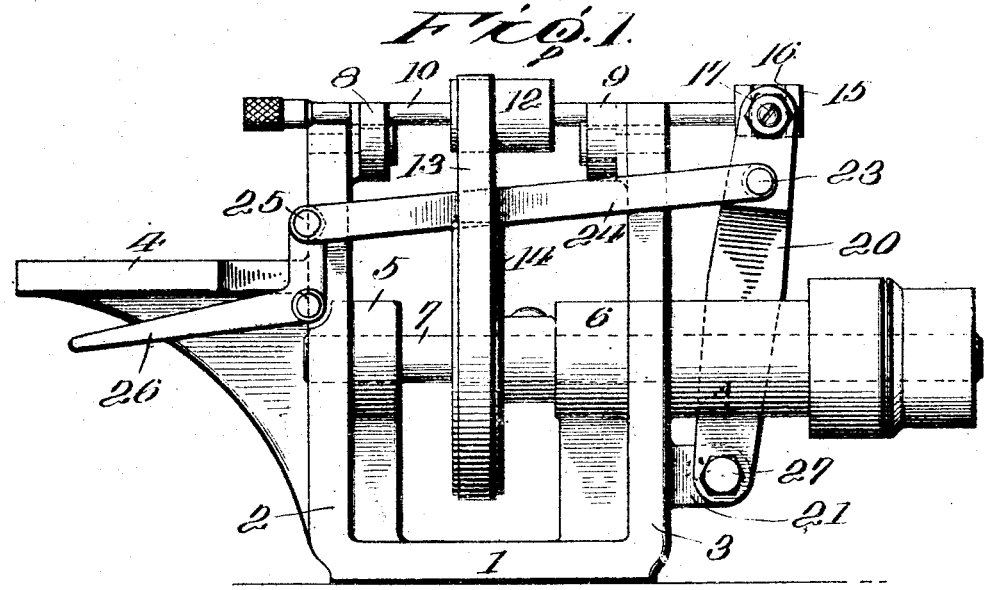
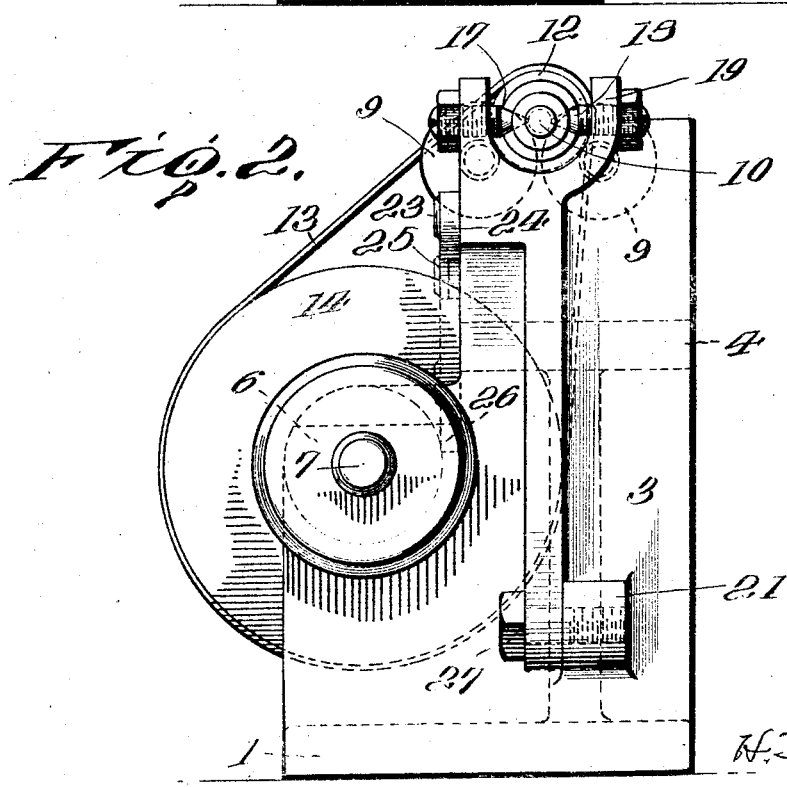
Inventor
H. T. Kingsbury
By
Attorneys

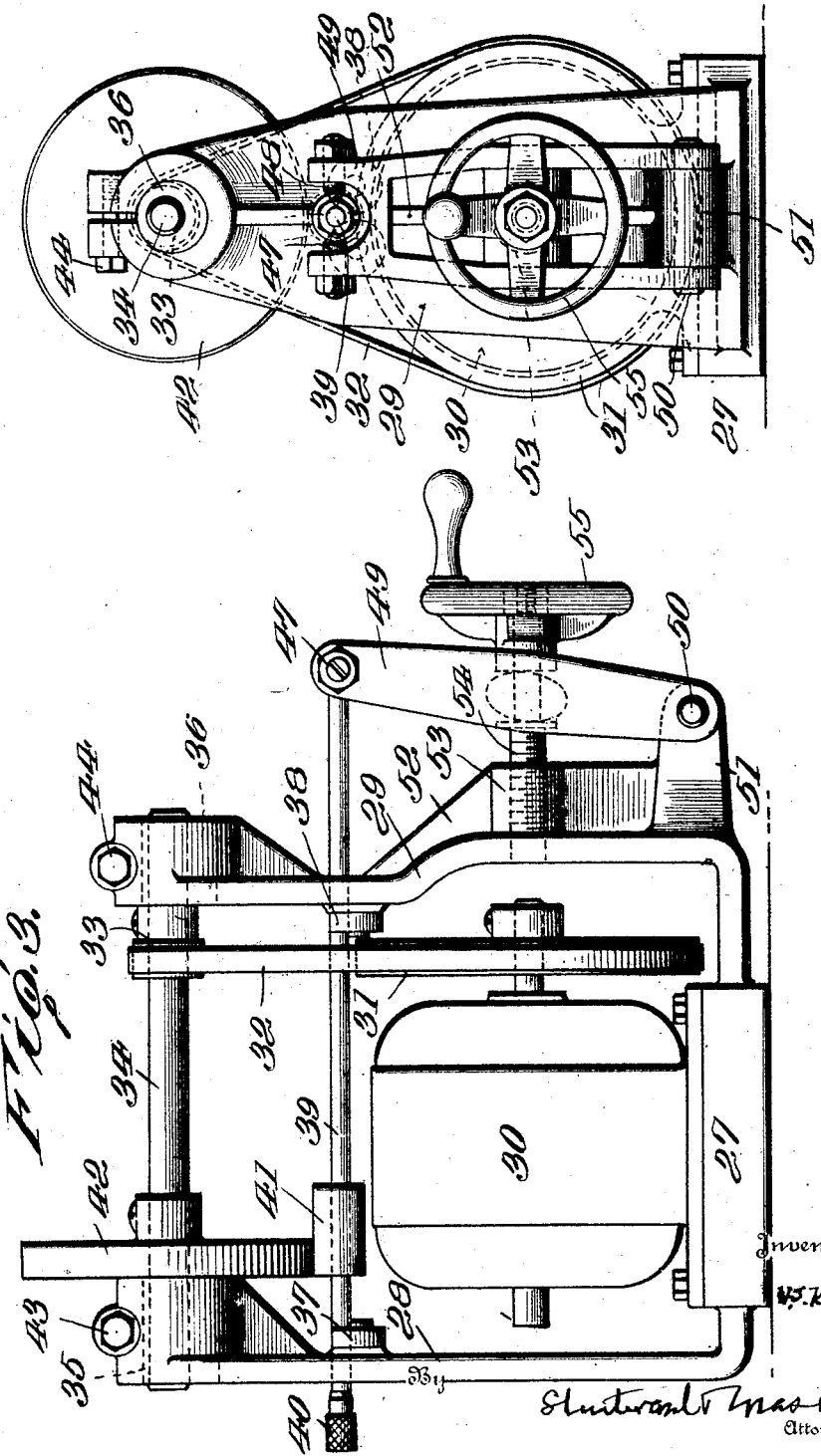

Patented Aug. 18, 1925.

1,550,264

UNITED STATES PATENT OFFICE.

HARRY T. KINGSBURY, OF KEENE, NEW HAMPSHIRE.

TOOL-SPINDLE BEARING.

Application filed December 6, 1921. Serial No. 520,371.

*To all whom it may concern:*

Be it known that I, HARRY T. KINGS-BURY, a citizen of the United States, residing at Keene, in the county of Cheshire, State of New Hampshire, have invented certain new and useful Improvements in Tool-Spindle Bearings, of which the following is a description, reference being had to the accompanying drawing and to the figures of reference marked thereon.

My invention relates to new and useful improvements in a tool spindle bearing.

The object of the invention is to mount a tool spindle so that it is free to rotate and at the same time is free to move longitudinally to allow of the feeding of the tool and to insure a positive straight movement of the spindle so as to cause an accurate working of the tool.

Another object of the invention is to provide a tool spindle of this character which can be readily raised off of the bearing and held thereon by its motive power, and at the same time provides a simple and effective structure having certain details of structure and combination of parts hereinafter more fully described.

In the accompanying drawings—

Figure 1 is a side elevation of a machine showing the tool spindle mounted on the bearings and driven by a belt;

Figure 2 is an end view showing one set of the roller bearings;

Figure 3 is a side elevation similar to Fig. 1, showing a friction drive for the tool spindle;

Figure 4 is an end view of Fig. 3.

Referring now to the drawings, 1 represents the base of a machine, which may be either a drilling machine, grinding machine or the like, and is provided at its ends with upwardly extending standards 2 and 3, in which are mounted the tool spindle, as will be later described. The standard 2 is provided with a work support 4, so arranged that the end of the tool spindle will come into the position so that it can operate on the work supported thereby. Said standards 2 and 3 are provided with bearings 5 and 6, in which is mounted the shaft 7, which is driven by a belt, or any other means. The upper ends of the standards 2 and 3 are provided with two sets of roller bearings 8 and 9, so arranged and shown that the tool spindle 10 rests loosely on the bearings. While I have shown roller bearings supporting the tool spindle, it will be understood that ball bearings, or any other bearings, could be used which would allow the free longitudinal movement of the tool spindle.

The tool spindle, as heretofore described, rests loosely upon the bearings and intermediate the same it is provided with an elongated pulley 12 over which passes a belt 13, which in turn passes over the pulley 14 carried by the shaft 7, and by means of which the tool spindle is rotated and the pull on the pulley 12 also holds the spindle down on the bearings, as well as holds it in its downward position on the bearings and yet allows the free rotation of the spindle and the free longitudinal movement of the spindle.

The rear end of the tool spindle 10 has rigidly secured thereon a collar 15, having a peripheral groove 16 into which extends the two pins 17 and 18, adjustably carried by the forked end 19 of the lever 20. The lower end of the lever 20 is pivoted to the bracket 21, carried by the standard at 22. Also pivoted to the lever 20 at 23 is a link 24 which extends forwardly adjacent the work holder 4, and is pivotally connected at 25 to the L-shaped lever 26.

By this structure, it will be seen that the rotation of the shaft 7 by any desired means, and through the belt 13, the tool spindle is rotated, the belt holding the same down on the bearings 8 and 9. By forcing down of the end of lever 26, the link 24 is drawn forward, forcing the lever 20 forward, and through the pins and peripheral groove 16, in the collar 15, the tool spindle is fed forward in a perfect horizontal direction, the belt 13 sliding on the elongated pulley 12.

In the form shown in Figs. 3 and 4 of the drawings, the base 27 and standards 28 and 29 are of a slightly different form and mounted upon the base is a motor 30 over which passes the belt 32, which also passes over the pulley 33, carried by the shaft 34. The shaft 34 is rotatably mounted in bearings 35 and 36 carried by the upper ends of the standards 28 and 29. Also carried by the standards 28 and 29, below their upper ends, are the two roller bearings 37 and 38, upon which rest the tool spindle 39, with the tool carrying chuck 40 at one end. Carried by the tool spindle, intermediate the roller bearings 37 and 38, is a friction roller 41 frictionally engaging the drive wheel 42, so that the tool spindle is rotated and held down upon the roller bearings, yet is free to move longitudinally. In order to obtain a friction drive contact between 41 and 42, the bearings 35 and 36 are eccentrically shown in Fig. 4 of the drawings, so that the shaft 34 may be raised or lowered and the bearings locked by the screws 43 and 44 when the proper adjustment is secured.

The end of the tool spindle 39 is provided with a peripheral groove 46, into which enter the pins 47 and 48, carried by the upper end of the lever 49. The lever 49 has its lower end pivoted at 50 to the lug 51, carried by the outer face of the standard 29. This standard 29 is also provided with a web 52 having a threaded opening into which extends the screw bolt 54 which passes through the lever 49 and has at its outer end the operating wheel 55, by means of which the bolt is rotated. The bolt 54 loosely passes through the lever 49 and is provided with a peripheral groove 56, into which extends lugs 57, carried by the lever 49, whereby the bolt is free to rotate in the lever and yet is held against longitudinal movement and the screwing of the bolt moves the lever 49 and this in turn moves the tool spindle longitudinally.

Having thus described my invention, what I claim as new and desire to secure by Letters Patent, is:

1. A machine of the character described comprising a frame, bearings carried thereby, a tool spindle loosely mounted on said bearings and having a rotary and horizontal movement, and driving means holding said spindle down on the bearings.

2. A machine of the character described comprising a frame, bearings carried thereby, a tool spindle loosely mounted on said bearings and having a rotary and horizontal movement, and rotary driving means holding the spindle down on the bearings.

3. A machine of the character described comprising a frame, two spaced anti-friction bearings carried thereby, a tool spindle loosely mounted on said bearings, means for feeding the spindle longitudinally on the bearings, and driving means for the spindle intermediate the bearings holding said spindle down on the bearings.

4. A machine of the character described comprising a frame, two spaced anti-friction bearings carried thereby, a tool spindle loosely mounted on said bearings, means for feeding the spindle longitudinally on the bearings, and driving means bearing on the spindle intermediate the bearings and holding the same down on the bearings.

5. A machine of the character described comprising a frame, a work support carried by one end of the frame, two spaced anti-friction bearings carried by the frame, a tool spindle loosely mounted on said bearings and having one end adjacent the work support, means for moving the tool spindle longitudinally on the bearings, and driving means bearing on the spindle intermediate the bearings and holding the same down on the bearings.

6. A machine of the character described, comprising a frame, two spaced bearings carried by the frame, a drill spindle resting loosely on said bearing and adapted to be raised bodily therefrom, means for feeding the drill spindle longitudinally on the bearings, and driving means bearing on the drill spindle intermediate the bearings and holding the spindle down on the bearings.

7. A machine of the character described, comprising a frame, two spaced bearings carried by the frame and having their upper ends open, a drill spindle loosely mounted on the bearings and adapted to be raised vertically from the bearings, and driving means bearing on the spindle intermediate the bearings and holding the same down on the bearings.

8. A machine of the character described, comprising a frame, two spaced anti-friction bearings carried by the frame and having their upper ends open so that the drill spindle loosely rotates thereon and may be raised bodily therefrom, means for feeding the spindle longitudinally on the bearings, a drive pulley mounted on the spindle, and means engaging the upper face of the drive pulley for holding the spindle down on the bearings and to allow the free longitudinal movement thereof.

9. A machine of the character described, comprising a frame, two spaced anti-friction bearings carried by the frame and having their upper ends open, a drill spindle loosely mounted on the bearing and adapted to be raised bodily therefrom, means for feeding the drill spindle longitudinally on the bearings, and an elongated drive pulley mounted on the drill spindle intermediate the bearings, and driving means engaging the upper face of the pulley for rotating the drill spindle and holding it down on the bearing and to allow the free longitudinal movement thereof.

10. A machine of the character described, comprising a frame, two spaced bearings carried by the frame, a drill spindle resting loosely on said bearing and having a rotary and horizontal movement thereon, and an elongated drive pulley mounted on the drill spindle intermediate the bearings, and a belt passing over the pulley for rotating the drill spindle, and holding it down on the bearings and to allow the free longitudinal movement thereof.

In testimony whereof, I affix my signature,

HARRY T. KINGSBURY.